Feb. 4, 1941.   E. A. BUEHLER   2,230,861
SANITARY FACILITIES FOR PETS, PARTICULARLY DOGS
Filed Feb. 5, 1940

Edward A. Buehler
Inventor

Patented Feb. 4, 1941

2,230,861

UNITED STATES PATENT OFFICE 2,230,861

SANITARY FACILITIES FOR PETS, PARTICULARLY DOGS

Edward A. Buehler, Troy Township, Oakland County, Mich., assignor of one-tenth to McConnell-Petermann Co., Inc., Detroit, Mich., a corporation of Michigan Application February 5, 1940, Serial No. 317,338

2 Claims. (Cl. 119—1)

This invention relates to sanitary facilities to be used indoors for pets, particularly dogs.

The objects of this invention are:

First, to provide an inexpensive sanitary facility wherein pets, particularly dogs, can relieve themselves at will;

Second, to provide a sanitary facility which does not require the addition of any absorbent material, such as paper, etc.;

Third, to provide a sanitary facility which can be easily and quickly cleansed under running water;

Fourth, to provide a sanitary facility which can be easily and quickly disinfected or deodorized;

Fifth, to provide a sanitary facility which does not require permanent or semi-permanent attachment to any plumbing system;

Sixth, to provide a sanitary facility which can be placed indoors wherever desired;

Seventh, to provide in conjunction with such a sanitary facility a scent means to attract pets, particularly dogs, to such sanitary facility; and Eighth, to provide a sanitary facility which may have such other advantages as may be hereinafter shown.

With the foregoing objects in view, this invention consists of the combination and arrangement of its parts as is hereinafter more fully described, as illustrated in the accompanying drawing, and as set forth in the claims therefor.

In the accompanying drawings, consisting of one sheet, forming a part hereof:

Figure 1:
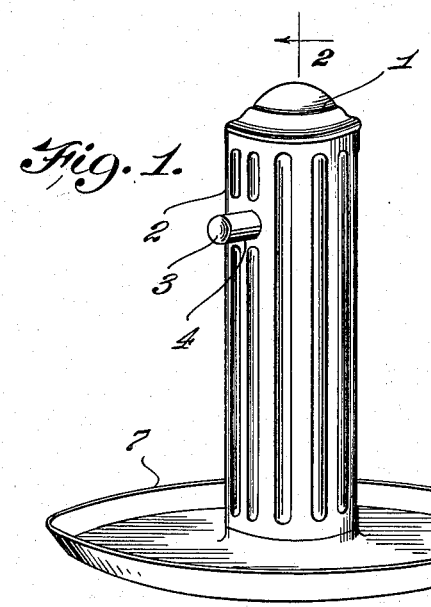
Fig. 1 is a perspective view of a preferred embodiment of this invention.
Figure 2:
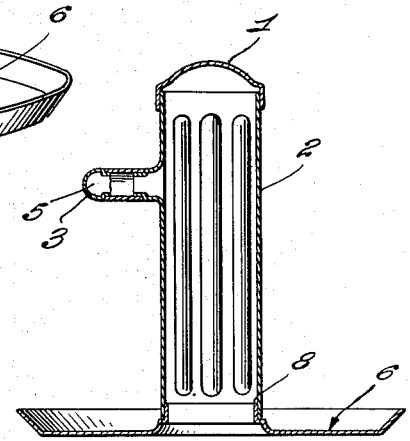
Fig. 2 is a sectional view of this invention on line 2—2 of Fig. 1.
Figure 3:
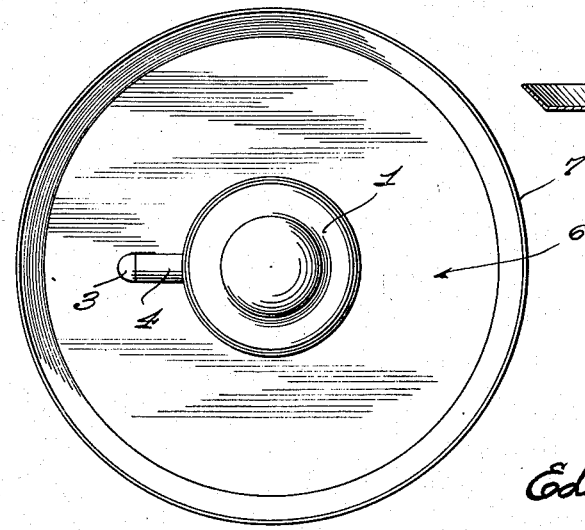
Fig. 3 is a plan view of this invention showing the same as it appears from above.

Pan 6 is intended to serve as a receptacle to receive and retain urine and other animal discharge. Pan 6, as shown, is circular in shape and of sufficient diameter to permit a reasonable range of movement for the animal; it has a lip or rim 7 of sufficient height to retain the normal amount of urine or other animal discharge likely to be deposited in pan 6 in intervals between cleaning.

Attached to the center of pan 6, over collar 8, in a perpendicular position, is a hollow cylindrical regularly indented post 2 simulating an ordinary type of fire hydrant but reduced somewhat in size in comparison thereto. A circular cap 1 is affixed to the top of post 2.

Extending angularly from post 2 is a cylindrical tube 4 which has at its outer extremity a removable closure cap 3, semi-spheroid in shape. Within the closure cap 3 and the cylindrical tube 4, an absorbent scent dispensing means 5 is contained.

All parts, except the absorbent scent dispensing means 5, may be constructed of metal, plastic substance, or other suitable material.

Pan 6, while shown as circular in shape, may be made in a variety of plane geometric shapes. Post 2, while shown as simulating a fire hydrant, may be made to simulate a variety of other upright objects. Post 2, while shown as hollow, may also be constructed of solid wood and surfaced with a suitable material, in which event collar 8 may be dispensed with and an island formed in the center of pan 6 to receive the base of post 2, which would then be attached to pan 6 by means of a bolt and nut or similar suitable attaching means.

The absorbent scent dispensing means 5 consists of any sponge-like or fibrous material capable of absorbing and dispensing animal scent material; or it may consist of a solidified animal scent bearing substance.

The semi-spheroid closure cap 3 is removable to permit replacement of the absorbent animal scent dispensing means 5 whenever desired.

Cleansing of this sanitary facility is accomplished by simply placing it under a running water tap or by spraying it with water under pressure through an ordinary garden hose.

Whenever it is desired to disinfect or deodorize this sanitary facility, this can be accomplished by the application of any suitable liquid disinfectant or deodorant.

It is understood that changes may be made in the form, size, proportion, and minor details of construction without departing from the spirit of this invention or sacrificing any of its advantages.

What I claim is:

1. A device of the character described comprising a pan with an angularly extending rim and having attached to its center, in a perpendicular position, a cylindrical post with a circular cap affixed thereto from which post angularly extends a cylindrical tube closed at its outer extremity by a removable cap, within which angularly extending assembly is contained an absorbent animal scent dispensing means.

2. A device of the character described comprising a circular pan with an angularly extending rim having in its center a collar to which is attached, in a perpendicular position, a hollow cylindrical regularly indented post closed at its top by a circular cap from which post angularly extends a cylindrical tube closed at outer extremity by a removable semi-spheroid cap, within which angularly extending assembly is contained an absorbent animal scent dispensing means.

EDWARD A. BUEHLER.